United States Patent
Zhang et al.

(10) Patent No.: US 10,106,412 B2
(45) Date of Patent: Oct. 23, 2018

(54) METHOD FOR PREPARING HIGH-DENSITY HEXAGONAL BORON NITRIDE CERAMIC MATERIAL

(71) Applicant: HOHAI UNIVERSITY, Nanjing, Jiangsu (CN)

(72) Inventors: Jianfeng Zhang, Jiangsu (CN); Yuping Wu, Jiangsu (CN); Gaiye Li, Jiangsu (CN); Sheng Hong, Jiangsu (CN); Wenmin Guo, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 246 days.

(21) Appl. No.: 15/100,837

(22) PCT Filed: Aug. 14, 2014

(86) PCT No.: PCT/CN2014/084358
§ 371 (c)(1),
(2) Date: Jun. 1, 2016

(87) PCT Pub. No.: WO2016/023200
PCT Pub. Date: Feb. 18, 2016

(65) Prior Publication Data
US 2016/0304346 A1    Oct. 20, 2016

(30) Foreign Application Priority Data
Aug. 11, 2014   (CN) .................. 2014 1 03937247

(51) Int. Cl.
*C01B 21/064* (2006.01)
*C04B 35/583* (2006.01)
(Continued)

(52) U.S. Cl.
CPC ........ *C01B 21/0648* (2013.01); *C04B 35/583* (2013.01); *C04B 35/6262* (2013.01); *C04B 35/6263* (2013.01); *C04B 35/62655* (2013.01); *C04B 35/62675* (2013.01); *C04B 35/62807* (2013.01); *C04B 35/6316* (2013.01); *C04B 35/64* (2013.01); *C04B 2235/3418* (2013.01); *C04B 2235/386* (2013.01); *C04B 2235/441* (2013.01); *C04B 2235/5436* (2013.01); *C04B 2235/604* (2013.01); *C04B 2235/6567* (2013.01); *C04B 2235/661* (2013.01); *C04B 2235/668* (2013.01); *C04B 2235/77* (2013.01); *C04B 2235/96* (2013.01)

(58) Field of Classification Search
None
See application file for complete search history.

(56) References Cited

FOREIGN PATENT DOCUMENTS

CN        104844178 B   *   9/2016

OTHER PUBLICATIONS

Google translation of Jun et al. Mar. 29, 2018.*

* cited by examiner

*Primary Examiner* — Guinever S Gregorio
(74) *Attorney, Agent, or Firm* — Rankin, Hill & Clark LLP

(57) ABSTRACT

A method for preparation of a high-density hexagonal boron nitride (hBN) ceramic material is disclosed. According to the method, the surface of hBN powder is coated with an evenly-dispersed $SiO_2$ nanoparticle layer using tetraethyl orthosilicate as a precursor, and then the high-density hBN ceramic material is obtained by pressureless sintering. The relative density of the prepared hBN ceramic material is over 80%.

10 Claims, 1 Drawing Sheet

(51) Int. Cl.
*C04B 35/626* (2006.01)
*C04B 35/628* (2006.01)
*C04B 35/63* (2006.01)
*C04B 35/64* (2006.01)

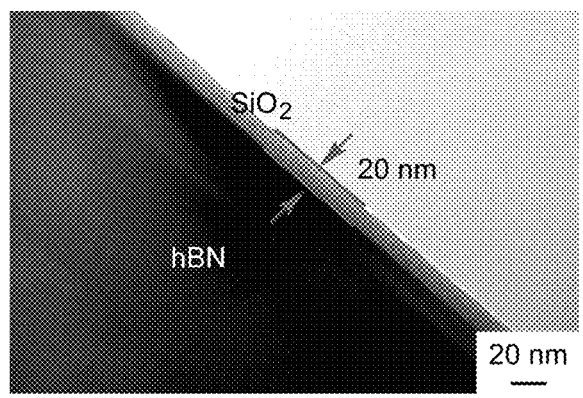

METHOD FOR PREPARING HIGH-DENSITY HEXAGONAL BORON NITRIDE CERAMIC MATERIAL

TECHNICAL FIELD

The invention belongs to the field of material processing, and particularly relates to a method for preparing a high-density hexagonal boron nitride ceramic material.

BACKGROUND

Hexagonal boron nitride (hBN) is also referred to as boron nitride, which is of a layered structure similar to graphite. With the advantages of good electrical insulating property, low dielectric constant and dielectric loss, high-temperature stability, good lubricity and chemical inertness and metal nonwetting property, hexagonal boron nitride is widely used as a solid lubricant in the high-temperature environment, a stripping agent in cast molding and injection molding, an evaporator boat for vacuum aluminizing, a wave-transmitting material, etc.

Hexagonal boron nitride ceramics are generally manufactured by causing powder which is formed after nitriding or ammonia decomposition of boron trichloride to undergo ball-milling mixing with boron oxide agglutinant and undergo pressureless sintering, hot pressing, thermal decomposition or a combustion technology. However, as the bonding force of hBN in the C-axis direction is far smaller than that in the direction perpendicular to the C-axis direction, crystal mainly grows in the plate surface direction, the growth in the thickness direction is slow, and thus a tabular crystal structure is formed. The tabular crystal structure forms a clamping piece bridging structure during sintering to achieve the effect of mutual supporting and hinder shrinkage of the material, and thus the obtained hBN ceramics are low in density. For example, after Hagio et al adopted a ball-milling method to perform mechanochemical activation on hBN powder, the density of the hBN ceramic material obtained at a sintering temperature of 2000° C. was 1.64 g·cm$^{-3}$ and was only 70% of the theoretical density (Journal of the American Ceramic Society, 72(8) 1482-1484 (1989)). Kurita et al adopted AlN and amorphous B as additives and obtained an hBN material with a relative density of 75.8% by pressureless sintering in the atmosphere of $N_2$ at 1500° C. (Shigen-to-Sozai; 105(2) 201-204 (1989)).

It is an effective measure to solve the hBN ceramic density problem by adding oxides such as $B_2O_3$, $Al_2O_3$, $Y_2O_3$ and $SiO_2$ to serve as sintering additives and improving diffusion coefficient and sintering power during sintering through the liquid phase generated during the sintering. Particularly, $SiO_2$ not only can promote sintering and densification of hBN, but also can improve oxidation resistance of hBN and usage temperature under high temperature, and thus $SiO_2$ receives extensive attention. Chen et al prepared hBN ceramics by combustion in the atmosphere of high-pressure nitrogen, and studied the influence of $SiO_2$ on hBN density. It is found according to research results that the density of hBN without adding $SiO_2$ is 71-75% while the density of hBN is improved to 75.4-78% after $SiO_2$ with a weight percentage of 10 wt. % is added, which indicates that the adding of $SiO_2$ improves the density of hBN effectively. On the other hand, since it is difficult to evenly disperse $SiO_2$ in ball-milling material mixing, the relative density is still low (lower than 80%) (Journal of Materials Science Letters, 19 (2000) 81-83). In their disclosed patent (a Chinese invention patent with a publication number of CN1310149A), Han Jie-cai et al prepared hBN ceramics by adopting a combustion synthesis process. After being pre-pressed into blank, the reactive raw materials undergo self-propagating combustion reaction under the $N_2$ pressure of no smaller than 70 MPa, and $SiO_2$ powder with a weight ratio of no larger than 60% was added, so as to synthesize an hBN-$SiO_2$ composite material. However, similarly, due to the fact that the raw materials were not mixed evenly, the density of the composite material was still low.

SUMMARY

Object of the invention: to solve the technical problems in the prior art, the invention provides a method for preparing a high-density hexagonal boron nitride ceramic material, which is simple to operate and has easiness in process condition control; and the density and oxidation resistance of the hexagonal boron nitride ceramic material are improved.

Technical solution: to solve the aforementioned technical problem, the invention provides a method for preparing a high-density hexagonal boron nitride ceramic material, comprising the following steps of:

(1) adding hBN powder into deionized water, and evenly stirring the hBN powder to obtain mixture of hBN powder and deionized water;

(2) adding ethanol dropwise into the mixture obtained through the step (1), causing the mass ratio of the dropwise added ethanol to the mixture to be 0.08-0.1; continuing to add strong ammonia water dropwise into the mixture to cause the pH of the solution to be 9-10, wherein the mass fraction of the strong ammonia water is 28%; after the mixture is evenly mixed, continuing to add mixed solution of tetraethyl orthosilicate and ethanol slowly dropwise until the mole ratio of tetraethyl orthosilicate in the mixed solution to deionized water in the step (1) is (1:4)-(1:8); after the mixed solution is added dropwise, sealing the bottle, and continuing to react for 5-20 h;

(3) after the reaction in the step (2) is over, filtering obtained powder, drying the powder, and grinding and sieving the powder;

(4) pre-sintering the sieved powder obtained through the step (3) in a high vacuum furnace, and evenly grinding and sieving the powder again after the pre-sintering;

(5) causing the powder obtained through the step (4) to undergo cold isostatic press molding, undergo high-temperature pressureless sintering in the atmosphere of $N_2$ and then undergo heat preservation for 1-3 h, so as to obtain a sample;

(6) after the sintering experiment is over, performing cooling and taking out the sample;

wherein the purity of the hBN powder is larger than 98%, and the particle size of the hBN powder is not larger than 10 microns; and the mass ratio of the hBN powder to the deionized water is 0.008-0.015.

Concretely, the stirring conditions in the step (1) are that magnetic stirring is performed; the stirring speed is 10-1000 rpm, and the stirring time is 1-10 h. Preferably, the stirring conditions are that the magnetic stirring is performed for 6-8 h at a stirring speed of 600-800 rpm.

Preferably, in the step (2), the dripping speed of ethanol is 1-10 ml/min; the dripping speed of strong ammonia water is 1-10 ml/min; and the dripping speed of the mixed solution of tetraethyl orthosilicate and ethanol is 1-20 ml/min. More preferably, the dripping speed of ethanol is 4-6 ml/min; the dripping speed of strong ammonia water is 4-6 ml/min; and the dripping speed of the mixed solution of tetraethyl orthosilicate and ethanol is 10-15 ml/min.

Preferably, in the step (2), in the mixed solution of tetraethyl orthosilicate and ethanol, the mass ratio of tetraethyl orthosilicate to ethanol is (1:5)-(1:10).

In the step (3), the conditions of powder drying are that the powder is dried for 10-30 h at 90-110° C.; and the conditions of powder grinding are that the powder is sieved through a 200-mesh sieve 2-4 times.

In the step (4), the conditions of powder pre-sintering are that the pre-sintering temperature is 700-900° C., and the pre-sintering time is 0.5-5 h; and the grinding conditions are that the powder is sieved through a 200-mesh sieve 2-4 times.

In the step (5), the molding pressure of cold isostatic press molding is 100-200 MPa.

In the step (5), the sintering temperature is 1600-1900° C.

Beneficial effects: compared with the prior art, the method for preparing a high-density hexagonal boron nitride (hBN) ceramic material has the following advantages:

(1) the surface of the hBN powder is coated with a $SiO_2$ nano layer in a mode of tetraethyl orthosilicate hydrolysis, and the method is simple, and the cost is low;

(2) the uniform dispersion of the $SiO_2$ sintering additive is achieved by coating the surface of the hBN powder with $SiO_2$, and the high-density hBN ceramics are obtained in combination with high-temperature pressureless sintering. The high-temperature usage temperature and high-temperature performances of hBN are improved while the usage amount of $SiO_2$ is reduced.

BRIEF DESCRIPTION OF DRAWINGS

FIG. 1 is a TEM image of the surface of hBN powder coated with a $SiO_2$ nano layer in a No. 2-1 experiment in Embodiment 2.

DETAILED DESCRIPTION

Embodiment 1

10 g of commercially available hBN powder (with a purity larger than 98% and a particle size of 1 micron) is placed in 1000 ml of deionized water and undergoes magnetic stirring for 7 h at a stirring speed of 600 rpm through a magnetic stirrer, so that mixed solution of the hBN powder and the deionized water is obtained; 100 ml of ethanol is added dropwise into the mixed solution at a speed of 5 ml/min, and 28 wt % of strong ammonia water is added dropwise at a speed of 5 ml/min until the pH of the solution is 9; after the solution is evenly mixed, mixed solution (the mass ratio of tetraethyl orthosilicate to ethanol is 1:5) of tetraethyl orthosilicate and ethanol is added slowly dropwise at a speed of 8 ml/min and continues to be stirred through the magnetic stirrer until the mole ratio of $H_2O$ to tetraethyl orthosilicate (TEOS) is 8:1; the bottle is sealed through a polyvinyl chloride film, and the reaction continues to be performed for 20 h; the powder is filtered and is dried for 30 h at 90° C., and after being ground in a mortar, the powder is sieved three times through a 200-mesh sieve; the powder is pre-sintered for 2 h at 900° C. in a high vacuum furnace, evenly ground again and sieved three times through a 200-mesh sieve; the pre-sintered and ground powder undergoes cold isostatic press molding at 180 MPa and undergoes pressureless sintering in the atmosphere of $N_2$; the sintering temperature is 1900° C., and the heat insulation time is 3 h; and after the sintering experiment is over, cooling is performed and a sample is taken out. The aforementioned experiment is repeated twice, and these experiments are marked as 1-1, 1-2 and 1-3 respectively.

Embodiment 2

10 g of commercially available hBN powder (with a purity larger than 98% and a particle size of 3 microns) is placed in 1000 ml of deionized water and undergoes magnetic stirring for 8 h at a stirring speed of 800 rpm through a magnetic stirrer, so that mixed solution of the hBN powder and the deionized water is obtained; 100 ml of ethanol is added dropwise into the mixed solution at a speed of 8 ml/min, and 28 wt % of strong ammonia water is added dropwise at a speed of 8 ml/min until the pH of the solution is 9; after the solution is evenly mixed, mixed solution (the mass ratio of tetraethyl orthosilicate to ethanol is 1:6) of tetraethyl orthosilicate and ethanol is added slowly dropwise at a speed of 10 ml/min with magnetic stirring until the mole ratio of $H_2O$ to tetraethyl orthosilicate (TEOS) is 7:1; a bottle opening is sealed through a polyvinyl chloride film, and the reaction is performed for 10 h; the powder is filtered and is dried for 24 h at 100° C., and after being ground in a mortar, the powder is sieved three times through a 200-mesh sieve; the dried powder is pre-sintered for 4 h at 800° C. in a high vacuum furnace, evenly ground again after the pre-sintering and sieved three times through a 200-mesh sieve; the pre-sintered and ground powder undergoes cold isostatic press molding at 200 MPa and undergoes pressureless sintering in the atmosphere of $N_2$; the sintering temperature is 1800° C., and the heat insulation time is 3 h; and after the sintering experiment is over, cooling is performed and a sample is taken out. The sample undergoes TEM characterization, and the result is as shown in FIG. 1. The aforementioned experiment is repeated twice, and these experiments are marked as 2-1, 2-2 and 2-3 respectively.

Embodiment 3

10 g of commercially available hBN powder (with a purity larger than 98% and a particle size of 5 microns) is placed in 1000 ml of deionized water and undergoes magnetic stirring for 9 h at a stirring speed of 700 rpm through a magnetic stirrer, so that mixed solution of the hBN powder and the deionized water is obtained; 100 ml of ethanol is added dropwise into the mixed solution at a speed of 10 ml/min, and 28 wt % of strong ammonia water is added dropwise at a speed of 10 ml/min until the pH of the solution is 9; after the solution is evenly mixed, mixed solution (the mass ratio of tetraethyl orthosilicate to ethanol is 1:7) of tetraethyl orthosilicate and ethanol is added slowly dropwise at a speed of 12 ml/min with magnetic stirring until the mole ratio of $H_2O$ to TEOS is 6:1; the bottle is sealed through a polyvinyl chloride film, and the reaction is performed for 15 h; the powder is filtered and is dried for 20 h at 110° C., and after being ground in a mortar, the powder is sieved three times through a 200-mesh sieve; the dried powder is pre-sintered in a high vacuum furnace at 900° C., evenly ground again after the pre-sintering and sieved three times through a 200-mesh sieve; the pre-sintered and ground powder undergoes cold isostatic press molding at 150 MPa and undergoes pressureless sintering in the atmosphere of $N_2$; the sintering temperature is 1800° C., and the heat insulation time is 2 h; and after the sintering experiment is over, cooling is performed and a sample is taken out. The aforementioned experiment is repeated twice, and these experiments are marked as 3-1, 3-2 and 3-3 respectively.

Embodiment 4

20 g of commercially available hBN powder (with a purity larger than 98% and a particle size of 8 microns) is placed in 1000 ml of deionized water and undergoes magnetic stirring for 7 h at a stirring speed of 900 rpm through a magnetic stirrer, so that mixed solution of the hBN powder and the deionized water is obtained; 100 ml of ethanol is added dropwise into the mixed solution at a speed of 8 ml/min, and 28 wt % of strong ammonia water is added dropwise at a speed of 8 ml/min until the pH of the solution is 9; after the solution is evenly mixed, mixed solution (the mass ratio of tetraethyl orthosilicate to ethanol is 1:8) of tetraethyl orthosilicate and ethanol is added slowly dropwise at a speed of 15 ml/min with magnetic stirring until the mole ratio of $H_2O$ to TEOS is 5:1; the bottle is sealed through a polyvinyl chloride film, and the reaction is performed for 10 h; the powder is filtered and is dried for 24 h at 100° C., and after being ground in a mortar, the powder is sieved three times through a 200-mesh sieve; the dried powder is pre-sintered for 5 h in a high vacuum furnace at 700° C., evenly ground again after the pre-sintering and sieved three times through a 200-mesh sieve; the pre-sintered and ground powder undergoes cold isostatic press molding at 160 MPa and undergoes pressureless sintering in the atmosphere of $N_2$; the sintering temperature is 1700° C., and the heat insulation time is 2 h; and after the sintering experiment is over, cooling is performed and a sample is taken out. The aforementioned experiment is repeated twice, and these experiments are marked as 4-1, 4-2 and 4-3 respectively.

Embodiment 5

10 g of commercially available hBN powder (with a purity larger than 98% and a particle size of 10 microns) is placed in 1000 ml of deionized water and undergoes magnetic stirring for 6 h at a stirring speed of 800 rpm through a magnetic stirrer, so that mixed solution of the hBN powder and the deionized water is obtained; 100 ml of ethanol is added dropwise into the mixed solution at a speed of 5 ml/min, and 28 wt % of strong ammonia water is added dropwise at a speed of 5 ml/min until the pH of the solution is 9; after the solution is evenly mixed, mixed solution (the mass ratio of tetraethyl orthosilicate to ethanol is 1:10) of tetraethyl orthosilicate and ethanol is added slowly dropwise at a speed of 20 ml/min with magnetic stirring until the mole ratio of $H_2O$ to TEOS is 4:1; the bottle is sealed through a polyvinyl chloride film, and the reaction is performed for 5 h; the powder is filtered and is dried for 24 h at 100° C., and after being ground in a mortar, the powder is sieved three times through a 200-mesh sieve; the dried powder is pre-sintered for 3 h in a high vacuum furnace at 900° C., evenly ground again after the pre-sintering and sieved three times through a 200-mesh sieve; the pre-sintered and ground powder undergoes cold isostatic press molding at 140 MPa and undergoes pressureless sintering in the atmosphere of $N_2$; the sintering temperature is 1600° C., and the heat insulation time is 1 h; and after the sintering experiment is over, cooling is performed and a sample is taken out. The aforementioned experiment is repeated twice, and these experiments are marked as 5-1, 5-2 and 5-3 respectively.

In conclusion, according to the invention, the surface of hBN is evenly coated with $SiO_2$ in a simple and practical method, so that the uniform dispersion of $SiO_2$ and hBN is achieved; and the high-density hBN ceramics (the density is larger than 80%) is obtained in a pressureless method, which is of great significance for improving density and oxidation resistance of hBN. Serving as a wave-transmitting material, insulating material and fireproof material and the like, the high-density hexagonal boron nitride ceramics, which is prepared through the novel method for achieving densification of the hexagonal boron nitride ceramic material by evenly coating the surface of the hexagonal boron nitride powder with a $SiO_2$ sintering additive nano layer in combination with high-temperature pressureless sintering, has wide application prospects in the fields such as aerospace.

TABLE 1

Particle size and content of $SiO_2$ that coating hBN powder and performance index of the hBN powder after sintering in embodiments 1-5

| | Coated hBN powder | | | | hBN ceramic block | |
| --- | --- | --- | --- | --- | --- | --- |
| Embodiment | hBN particle size/micron | $SiO_2$ particle size/micron | $SiO_2$ content/wt % | Sintering parameter | Relative density | Strength/MPa |
| 1-1 | 1 | 10 | 1% | 1900° C./3 h | 82% | 78 |
| 1-2 | 1 | 9.8 | 1.2% | 1900° C./3 h | 81.5 | 79 |
| 1-3 | 1 | 10.1 | 1.1% | 1900° C./3 h | 82.5 | 78 |
| 2-1 | 3 | 20 | 1.8% | 1800° C./3 h | 84% | 70 |
| 2-2 | 3 | 19.5 | 1.7% | 1800° C./3 h | 84.3% | 71 |
| 2-3 | 3 | 21.5 | 1.75% | 1800° C./3 h | 83.8% | 72 |
| 3-1 | 5 | 30 | 2.7% | 1800° C./2 h | 85% | 67 |
| 3-2 | 5 | 28.9 | 2.8% | 1800° C./2 h | 85.2% | 66 |
| 3-3 | 5 | 31.2 | 2.6% | 1800° C./2 h | 85.3% | 68 |
| 4-1 | 8 | 44 | 3.4% | 1700° C./2 h | 86% | 66 |
| 4-2 | 8 | 42 | 3.5% | 1700° C./2 h | 86.1% | 65 |
| 4-3 | 8 | 41 | 3.3% | 1700° C./2 h | 86.4% | 64 |
| 5-1 | 10 | 58.9 | 4.9% | 1600° C./1 h | 85.1% | 62 |
| 5-2 | 10 | 31 | 5.1% | 1600° C./1 h | 85.2% | 63 |
| 5-3 | 10 | 60 | 5% | 1600° C./1 h | 85% | 63 |

The invention claimed is:

1. A method for preparing a high-density hexagonal boron nitride (hBN) ceramic material, comprising:
    (1) adding hBN powder into deionized water, and stirring the hBN powder to obtain a mixture of hBN powder and deionized water;

(2) adding ethanol dropwise into the mixture obtained through the step (1), causing the mass ratio of the dropwise added ethanol to the mixture to be 0.08-0.1; then, adding ammonia water dropwise into the mixture to cause the pH of the solution to be 9-10; after the mixture is mixed, adding mixed solution of tetraethyl orthosilicate and ethanol dropwise until the mole ratio of tetraethyl orthosilicate in the mixed solution to deionized water in the step (1) is (1:4)-(1:8); after the mixed solution is added dropwise, sealing the bottle, and continuing to react for 5-20 h, wherein the dripping speed of the ethanol is 1-10 ml/min, wherein the dripping speed of ammonia water is 1-10 ml/min, and wherein the dripping speed of the mixed solution of tetraethyl orthosilicate and ethanol is 1-20 ml/min;

(3) after the reaction in the step (2) is over, filtering the obtained powder, drying the powder, and grinding and sieving the powder;

(4) pre-sintering the sieved powder obtained through the step (3) in a high vacuum furnace, and grinding and sieving the powder again after the pre-sintering;

(5) subjecting the powder obtained through the step (4) to cold isostatic press molding, then to high-temperature pressureless sintering in an atmosphere of $N_2$ for 1-3 h, so as to obtain a sample; and (6) after step (5), cooling the sample.

2. The preparation method according to claim 1, wherein the purity of the hBN powder is greater than 98%, and the particle size of the hBN powder is not larger than 10 microns; and the mass ratio of the hBN powder to the deionized water is 0.008-0.015.

3. The preparation method according to claim 1, wherein the stirring conditions in the step (1) are that magnetic stirring is performed, the stirring speed is 500-1000 rpm, and the stirring time is 1-10 h.

4. The preparation method according to claim 1, wherein in the step (2), in the mixed solution of tetraethyl orthosilicate and ethanol, the mass ratio of tetraethyl orthosilicate to ethanol is (1:5)-(1:10).

5. The preparation method according to claim 1, wherein in the step (3), the conditions of powder drying are that the powder is dried for 10-30 h at 90-110° C.; and the conditions of powder grinding are that the powder is sieved through a 200-mesh sieve 2-4 times.

6. The preparation method according to claim 1, wherein in the step (4), the conditions of powder pre-sintering are that the pre-sintering temperature is 700-900° C., and the pre-sintering time is 0.5-5 h; and the grinding conditions are that the powder is sieved through a 200-mesh sieve 2-4 times.

7. The preparation method according to claim 1, wherein in the step (5), the molding pressure of cold isostatic press molding is 100-200 MPa.

8. The preparation method according to claim 1, wherein in the step (5), the sintering temperature is 1600-1900° C.

9. A method for preparing a high-density hexagonal boron nitride (hBN) ceramic material, comprising:

(1) adding hBN powder into deionized water, and stirring the hBN powder to obtain a mixture of hBN powder and deionized water;

(2) adding ethanol dropwise into the mixture obtained through the step (1), causing the mass ratio of the dropwise added ethanol to the mixture to be 0.08-0.1; then, adding ammonia water dropwise into the mixture to cause the pH of the solution to be 9-10; after the mixture is mixed, adding mixed solution of tetraethyl orthosilicate and ethanol dropwise until the mole ratio of tetraethyl orthosilicate in the mixed solution to deionized water in the step (1) is (1:4)-(1:8); after the mixed solution is added dropwise, sealing the bottle, and continuing to react for 5-20 h;

(3) after the reaction in the step (2) is over, filtering the obtained powder, drying the powder, and grinding and sieving the powder, wherein the powder is dried for 10-30 h at 90-110° C., wherein the powder is sieved through a 200-mesh sieve 2-4 times;

(4) pre-sintering the sieved powder obtained through the step (3) in a high vacuum furnace, and grinding and sieving the powder again after the pre-sintering;

(5) subjecting the powder obtained through the step (4) to cold isostatic press molding, then to high-temperature pressureless sintering in an atmosphere of $N_2$ for 1-3 h, so as to obtain a sample; and (6) after step (5), cooling the sample.

10. A method for preparing a high-density hexagonal boron nitride (hBN) ceramic material, comprising:

(1) adding hBN powder into deionized water, and stirring the hBN powder to obtain a mixture of hBN powder and deionized water;

(2) adding ethanol dropwise into the mixture obtained through the step (1), causing the mass ratio of the dropwise added ethanol to the mixture to be 0.08-0.1; then, adding ammonia water dropwise into the mixture to cause the pH of the solution to be 9-10; after the mixture is mixed, adding mixed solution of tetraethyl orthosilicate and ethanol dropwise until the mole ratio of tetraethyl orthosilicate in the mixed solution to deionized water in the step (1) is (1:4)-(1:8); after the mixed solution is added dropwise, sealing the bottle, and continuing to react for 5-20 h;

(3) after the reaction in the step (2) is over, filtering the obtained powder, drying the powder, and grinding and sieving the powder;

(4) pre-sintering the sieved powder obtained through the step (3) in a high vacuum furnace, and grinding and sieving the powder again after the pre-sintering, wherein the pre-sintering temperature is 700-900° C., wherein the pre-sintering time is 0.5-5 h, wherein the powder is sieved through a 200-mesh sieve 2-4 times;

(5) subjecting the powder obtained through the step (4) to cold isostatic press molding, then to high-temperature pressureless sintering in an atmosphere of $N_2$ for 1-3 h, so as to obtain a sample; and (6) after step (5), cooling the sample.

* * * * *